Patented May 23, 1950

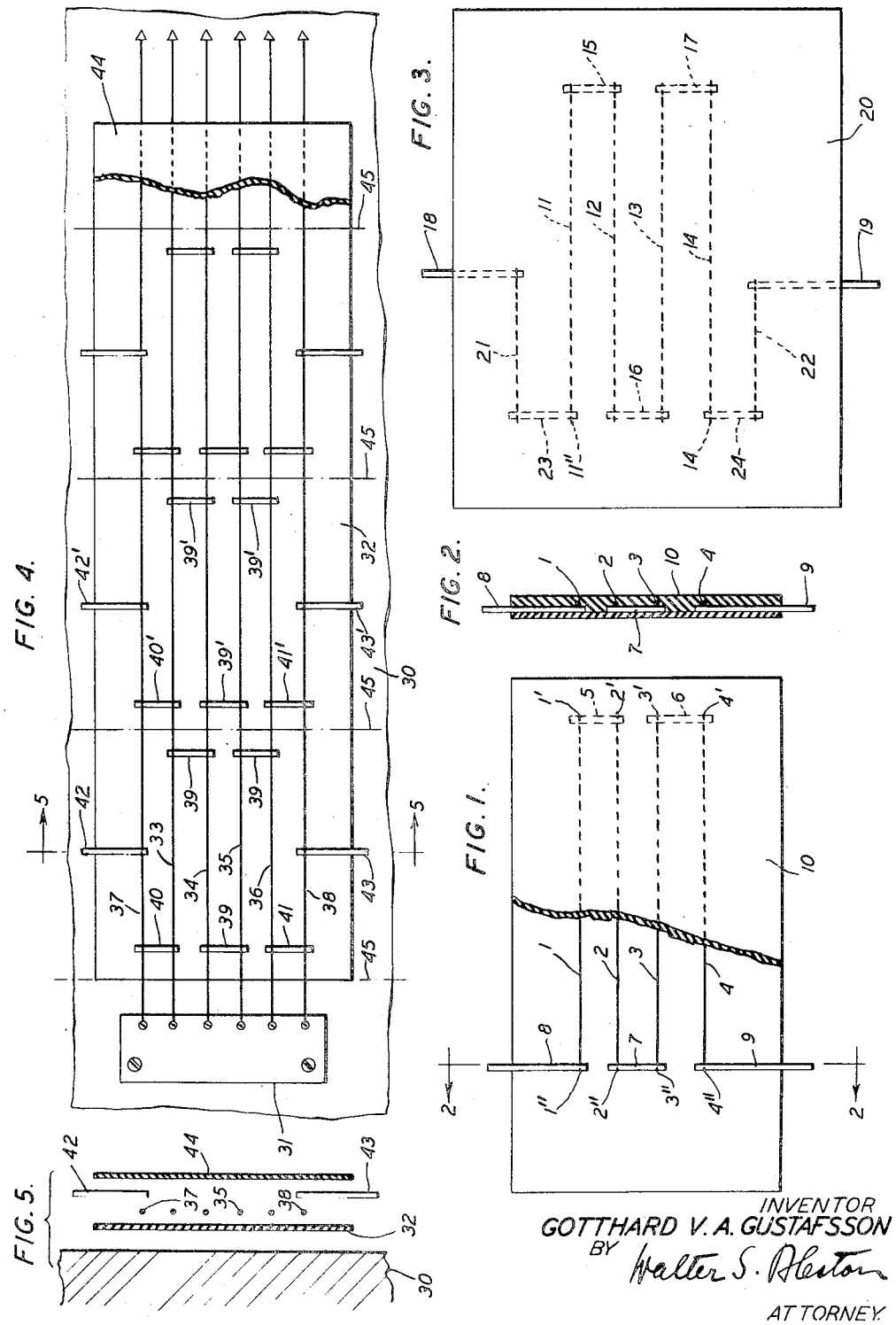

2,508,456

UNITED STATES PATENT OFFICE 2,508,456

ELECTRIC STRAIN GAUGE

Gotthard V. A. Gustafsson, Stockholm, Sweden, assignor of one-half to Arnold U. Huggenberger, Zurich, Switzerland Application September 17, 1948, Serial No. 49,673
In Sweden September 25, 1947

6 Claims. (Cl. 201—63)

The invention relates to strain gauges. Strain gauges are frequently used for measuring deformations, displacements, tensions, forces, torques, oscillations, etc. In its conventional form, a strain gauge consists of a resistance wire such as, for instance, of a copper-nickel alloy or a nickel-chromium alloy, the wire being wound in loop or zig-zag shape with the aid of pins or hooks. The loops or zig-zags are cemented to a support or carrier or burnt into it with the aid of an artificial resin. In another conventional form, the wire is helically coiled about a carrier of e. g. paper and glued or cemented thereto. Thus, the well-known strain gauges consist of at least three elements, viz. the winding, the carrier and the adhesive. The winding of the wire of such conventional strain gauges shows bends or curves of small radii made during the production by cold-working which affects unfavorably physical properties of the wire so that hysteresis, permanent deformations and so on impair the transmission.

Such a strain gauge is conventionally applied to a piece to be tested by gluing it thereto with the aid of an adhesive or by burning it thereon. The strain gauge thus applied to the piece to be tested is connected in a circuit of an electrical resistance bridge e. g. in the arrangement of a Wheatstone bridge in order to measure the change of its resistance caused by the deformation of the piece to be tested, which change is equivalent to the deformation, elongation, force, torque, etc. to be measured.

The most important drawbacks of these well-known strain gauges are their transverse sensitiveness, temperature sensitiveness and humidity sensitiveness. All the conventional strain gauges use, as carrier of the wire loops, paper which as it is well known, is a material extremely sensitive to changes of temperature and humidity. Furthermore, all strain gauges are opaque. In consequence, it is impossible to ascertain whether there is a faultless and perfect contact throughout when the strain gauge is imposed on the piece which is subject to deformations. Such perfect contact, however, is a prerequisite for a faultless transmission of the deformations of the strain gauge. Faulty measurements may also be the result of too large a spacing of the wire from the surface of the piece to be tested, owing to the thickness of the carrier, and it is well known that the faulty indications due to that cause may be very considerable.

The invention aims to provide a strain gauge which avoids or at least minimizes the mentioned drawbacks, and its object is the provision of a strain gauge which is not or only little sensitive to temperature or humidity or to transverse strains, or to more than one of the mentioned three factors simultaneously.

The invention furthermore aims to provide a strain gauge which permits ascertaining whether there exists a faultless contact throughout between the piece to be tested and the strain gauge imposed thereon; it also aims to provide a strain gauge of such a structure that the gauge wire can be applied very closely to the surface to which the strain gauge is to be bonded.

Another object of the invention is a method of producing a strain gauge having some or all of the mentioned advantages.

Further objects and details of the invention will be apparent from the description given hereinafter and the accompanying drawing illustrating several embodiments thereof by way of example.

In the drawing,

Fig. 1 is a diagrammatical top plan view, partly broken, of a strain gauge according to the invention.

Fig. 2 is a cross-section along line 2—2 of Fig. 1.

Fig. 3 is a diagrammatical top plan view of a modification.

Fig. 4 is a diagrammatical top plan view illustrating the method of production according to the invention, of strain gauges of the type of Fig. 3, and Fig. 5 is a cross-section along line 5—5 of Fig. 4. films and wires being shown separated.

Referring now to Figs. 1 and 2 a number of straight resistance wires, e. g. of a nickel-chromium alloy, in the illustrated example, four wires 1, 2, 3 and 4, are arranged side by side in a parallel and spaced relationship to one another. The wire ends on the one side are denoted by 1', 2', 3' and 4' and those on the other side by 1", 2", 3" and 4". Pieces 5, 6 and 7 of transverse wires connect the wires 1, 2, 3, 4, zig-zag fashion, meaning that piece 5 connects the wire ends 1', 2', piece 7 the wire ends 2", 3", and piece 6 the ends 3', 4'. Thus it will be clear that the resistance wires 1 to 4 are connected in series by means of the transverse wires 5 to 7. The transverse wires are preferably so selected that their conductivity is higher than that of the resistance wires. For this reason they should either have a larger cross-section than the longitudinal wires or their material should at least have higher conductive properties. Thus if the wires 1 to 4 are of a nickel chromium alloy, the wires 5 to 7 may consist e. g. of copper. In this manner it can be attained that the resistance wires, i. e. the actually gauging wires are perfectly straight and free of any bends whereby the transverse sensitivity of the strain-gauge will be practically eliminated or at least greatly reduced. Terminals such as wires 8 and 9 are connected to the ends 1" and 4" of the outer resistance wires. The described wire system is embedded in a thin film 10 of insulating material. Such films with enclosed wire system can be produced in very thin layers e. g. by spraying, casting, pressing, vulcanizing or polymerizing depending on the film material. Among the many kinds of useful film materials, I have found an air drying lacquer and a carbamide-modified cellulose-lacquer which can be baked as particularly well suited for the purpose. However, other materials like cements, artificial resins, etc., may be employed. There is also, for instance, the possibility of making the strain-gauge by forming the wire system on a thin film of electrically insulating material, thereupon, applying a second film on top of this system, and bonding the second film to the first by a suitable operation e. g. by drying, baking, pressing or polymerizing, so as to form a thin homogeneous strip. This thin strip may, then, be bonded by an adhesive consisting of the same kind of material of which it consists, to the piece to be tested or subjected to deformations. In this manner a particularly intimate and permanent bond can be obtained, which is of an utmost importance for a faultless transmission of the deformations to the strain-gauge. The mentioned film may consist of a transparent material as e. g. the aforementioned carbamide-modified cellulose lacquer. If the film material is so selected, it can be readily checked whether the strain gauge is faultlessly bonded to the body subjected to deformations. In particular, it can be ascertained whether or not little air bubbles are inclosed which might disturb the transmission of the deformations. It is also possible to apply colored films in order to facilitate the distinguishing of the strain gauges if gauges with different resistance wires are used. For instance, a kind of resistance wire may be used having such properties that the change of its electrical resistance is influenced practically not at all by a deformation but very strongly by changes of the temperature.

In order to obtain a strain gauge non-sensitive to the temperature of the piece to be tested, the entire strain gauge system must have the same sensitiveness to temperature as the material of the piece to which the strain gauge is to be attached. In Fig. 3 an example of a strain gauge according to the invention is illustrated in which the entire wire system is compensated as to changes of the temperature with respect to the material of a piece to be tested. This is accomplished by the addition of the two wires 21 and 22 of other material to the wires of the system shown in Fig. 1. Thus, in the embodiment of Fig. 3 the resistance wires 11, 12, 13 and 14 with transverse wires 15, 16 and 17 are, respectively, similar to the wires 1 to 7 of Fig. 1. Two outer wires 21 and 22 are added, and their adjacent ends are connected by transverse wires 23 and 24, respectively, to the wire ends 11″ and 14″. The other ends of the wires 21 and 22 are connected to the terminal wires 18 and 19, respectively. The entire wire system is bonded to the film piece 20. By properly selecting the material of the wires 21 and 22 different from that of the wires 11 to 14, and by properly selecting also the length of these wires the desired compensation as to temperature can be attained. It will be understood that the illustrated arrangement of the compensating wires 21 and 22 in relation to the wires 11 to 14 is merely an example, and that other suitable relative arrangements can be made for the indicated purpose.

The strain gauge of the type just described renders it possible to do without the auxiliary strain gauge which is necessary when strain gauges of the conventional type are used. According to the conventional procedure such an auxiliary strain gauge has to be attached to a piece of the same material as that of the body to be tested, which piece, however, is not subjected to deformations and, therefore, reacts only to changes of temperatures. This auxiliary gauge together with the main strain gauge which is applied to the piece to be tested is also connected in the circuit of the resistance bridge that the influence of the temperature is eliminated in the measurement. It will be clear that the strain gauge according to the present invention is highly advantageous, as it renders it possible to accomplish certain measurements with one strain gauge where the earlier art required two devices of the conventional type, viz. the main strain gauge and the auxiliary strain gauge. However, there are even cases where a temperature compensation is desired but the conventional method of using a main strain gauge and an auxiliary strain gauge is not applicable, for instance, where during the production of the piece to be tested the strain gauge is built into the material subjected to deformations, e. g. in the production of a piece made of several parts of insulating material by hot pressing, or in the production of parts of concrete or in other cases. In all such cases where an auxiliary strain gauge cannot be applied for the stated purpose, a strain gauge according to the invention can be successfully used as it is self-compensating as to the effect of temperature.

The invention also comprises a novel method of production of the strain gauge hereinbefore described. An example of its application to a strain gauge as shown in Fig. 3 is illustrated in Figs. 4 and 5. To a working surface 30 such as a smooth metal surface, an end piece 31 is secured. Now, according to the new method, a thin film 32 of insulating material is spread on that surface by a suitable operation, as for instance by spraying. Thereupon, a number of parallel wires as many as desired in the strain gauges to be produced will be attached with their ends to the piece 31 by means not shown. In the illustrated example there are four resistance wires 33, 34, 35 and 36 and two temperature compensation wires 37 and 38, which may be of a different cross-section or material or both from those of the resistance wires. The wires are uniformly stretched on the film 32. The stretching which may be accomplished e. g. by weights (not shown) suspended from the wires, is indicated by the arrow heads at the free ends of the wires. Now the short transverse wires 39, 40 and 41 will be inserted in such an arrangement that they connect the resistance wire portions and the compensation wires 37 and 38 in series and that the distance of the two transverse wires which engage the same resistance wire corresponds to the desired measurement length of the strain gauge. Also terminal wires 42 and 43 will be inserted so as to engage the compensation wires 37 and 38 respectively. The distance of the wires 42 and 43 from the wires 40 and 41, respectively, will be so selected that the desired temperature compensation will be attained. The correct position of the wires 42 and 43 can be found by testing. All the transverse wires may be connected to the longitudinal wires, i. e. the resistance and the compensation wires, in their correct positions by soldering or welding. At a short distance from the transverse wires 39 on the right hand side, a second set of transverse wires 39′, 40′, 41′ and terminal wires 42′ and 43′ will be attached to the longitudinal wires on a second section of the underlying film so as to form the same pattern as the wires 39 to 43, and the forming of such transverse wire patterns is repeated for the remainder of the length of the film 32 on the working surface 30. A total of three such patterns equivalent to three strain gauges are shown in the drawing. All the transverse wires (39, 40, 41, 42, and 43) may be inserted by arranging all over the gauge transverse wires and then the parts not wanted to form the desired pattern are cut away. When the wire system has been completed, another film 44 may be applied on top of it and so bonded to the film 32 that a uniform homogeneous strip is produced. The second film may be applied in various ways, for instance by spraying and subsequent drying, by pressing a prepared film, cold or warm, on the first film, by vulcanizing, by casting or by any other suitable and conventional method. Thereupon the film strip may be severed at the dash and dot lines 45 into separate strain gauges which may then be individually calibrated. It will be noticed that the transverse wires are slightly spaced from the adjacent lines of severance 45, respectively, so that the ends of the longitudinal wires of each section somewhat project beyond the adjacent transverse wires. This is an advisable feature of the completed gauges as the overshooting parts of the longitudinal wires contribute to transfer the forces stretching or compressing them, thus relieving the transverse wires and their connections from stresses, and thereby rendering the gauges useful for higher tension and compression. After the calibrating, the individual strain gauges will be removed from the working surface and are then ready for use. This method of production insures, contrary to the conventional methods, a uniform quality, a very small total thickness of the strain gauge, an individual calibrating of each single strain gauge, and compensation for temperature and humidity. In addition the transverse sensitiveness present in conventional strain gauges is eliminated or at least greatly reduced so that a clear and faultless measurement of deformations can be obtained.

In order to produce strain gauges of the type of Fig. 1 the wires 37 and 38 will be omitted and the terminals 42 and 43 will be attached to the wires 33, 36 in the places of the transverse wires 40, 41.

It will be apparent to those skilled in the art that many alterations and modifications of the structure shown and described can be made without departing from the essence and spirit of the invention which for this reason shall not be limited but by the scope of the appended claims.

I claim:

1. A strain gauge comprising a plurality of parallel longitudinal wires, transverse wires on top of and conductively bonded by fusion to said longitudinal wires at short distances from the ends of said longitudinal wires so as to connect the longitudinal wires in series, said transverse wires having a greater cross-sectional conductivity than said longitudinal wires, and a film of insulating material in which said longitudinal and transverse wires are completely embedded.

2. A strain gauge comprising a plurality of parallel longitudinal wires, transverse wires on top of and conductively bonded by fusion to said longitudinal wires so as to connect the longitudinal wires in series, said transverse wires being spaced a short distance from the ends of said longitudinal wires to which they are bonded, and a film of insulating material in which said longitudinal and transverse wires are embedded.

3. A method of making a strain gauge which comprises providing a film layer of an insulating material on a working surface, stretching a plurality of resistance wires in parallel and spaced relationship to one another under constant tension on said film, placing while maintaining said tension transverse wires each of a length according to the spacing of two adjacent resistance wires in such a pattern on top of and across each pair of said resistance wires and conductively bonding them thereto by fusion that the resistance wires are connected in series, attaching terminal pieces to the outermost resistance wires, providing a second film layer on top of said wires, bonding the film layer to each other, and removing the so formed strain gauge from said working surface.

4. A method as claimed in claim 3 wherein said film layers are produced by spraying.

5. A method of making strain gauges which comprises providing an elongated layer of insulating film material on a supporting surface, stretching a plurality of resistance wires on and lengthwise of said film layer in parallel and spaced relationship to one another, conductively bonding by fusion, in a first section of said layer, transverse wires to said resistance wires at short distances from the ends of said section, the length of said section being selected according to the desired length of a strain gauge to be produced, said transverse wires having a length according to the spacing of two adjacent resistance wires and being arranged in a pattern so as to connect said resistance wires within said section in series, securing terminal pieces to the outermost resistance wires within said section, continuing conductively bonding by fusion transverse wires and terminal pieces in like patterns to the resistance wires within subsequent film layer sections, applying a second film layer on top of the wires within said sections and bonding it to said first layer, severing the resulting film strip with the wires embedded therein between each two adjacent sections, and removing said sections from said supporting surface.

6. A method as claimed in claim 5 further comprising the step of calibrating the so produced strain gauges before their removal from said supporting surface.

GOTTHARD V. A. GUSTAFSSON.

REFERENCES CITED

The following references are of record in the file of this patent:

UNITED STATES PATENTS

| Number | Name | Date |
| --- | --- | --- |
| 1,050,912 | Bolling | Jan. 21, 1913 |
| 2,350,972 | Ruge | June 6, 1944 |
| 2,390,038 | Ruge | Nov. 27, 1945 |
| 2,415,082 | Burr | Feb. 4, 1947 |
| 2,434,628 | Simmons | Jan. 13, 1948 |

FOREIGN PATENTS

| Number | Country | Date |
| --- | --- | --- |
| 566,546 | Great Britain | Jan. 3, 1945 |

OTHER REFERENCES

De Forest et al., "The Development of Strain Gages," Technical Notes National Advisory Committee for Aeronautics, No. 744, January 1940, 38 pages and 13 sheets of drawings, page 3 relied upon.